Figure 1:
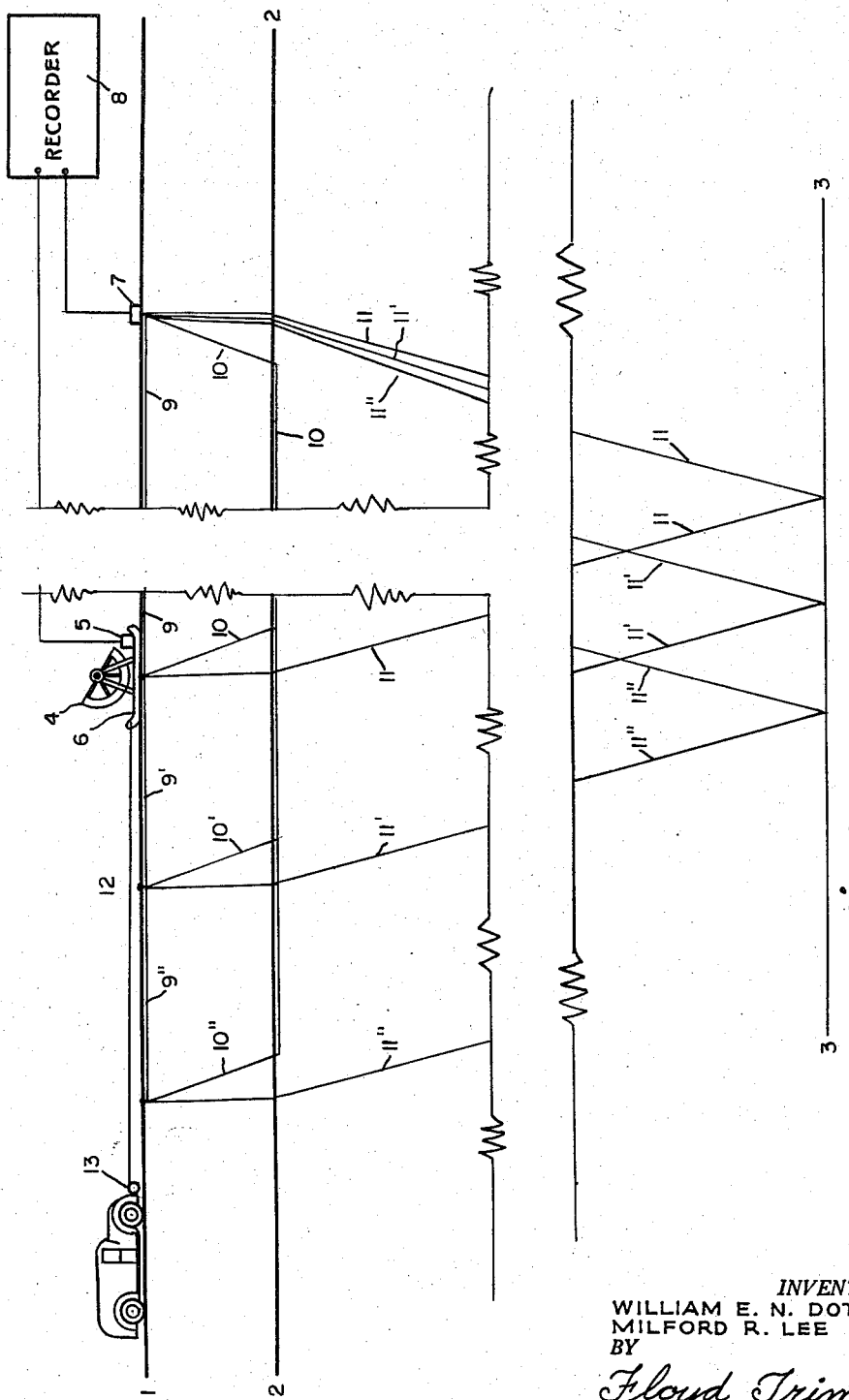

Feb. 24, 1959

W. E. N. DOTY ET AL 2,874,795

METHOD AND APPARATUS FOR DETERMINING THE TRAVEL TIMES
OF A SIGNAL PROPAGATED OVER A PLURALITY OF PATHS

Filed Oct. 20, 1954

2 Sheets-Sheet 1

INVENTORS.
WILLIAM E. N. DOTY
MILFORD R. LEE
BY
Floyd Trimble
ATTORNEY

Feb. 24, 1959 W. E. N. DOTY ET AL 2,874,795
METHOD AND APPARATUS FOR DETERMINING THE TRAVEL TIMES
OF A SIGNAL PROPAGATED OVER A PLURALITY OF PATHS
Filed Oct. 20, 1954 2 Sheets-Sheet 2

INVENTORS.
WILLIAM E. N. DOTY
MILFORD R. LEE
BY
Floyd Trimble
ATTORNEY

United States Patent Office

2,874,795
Patented Feb. 24, 1959

2,874,795

METHOD AND APPARATUS FOR DETERMINING THE TRAVEL TIMES OF A SIGNAL PROPAGATED OVER A PLURALITY OF PATHS

William E. N. Doty and Milford R. Lee, Ponca City, Okla., assignors to Continental Oil Company, Ponca City, Okla., a corporation of Delaware Application October 20, 1954, Serial No. 463,553

12 Claims. (Cl. 181—.5)

This invention relates to the art of determining the travel times of a signal propagated over a plurality of paths between spaced locations. It is particularly applicable for the determination of the travel times of the several energy components into which a single emitted signal may divide and which components respectively progress through different channels.

The present invention will be found of particular utility in the field of seismic exploration. Since this field is one in which the invention will have great utility, it will be described as applied specifically to that field.

In seismic exploration, the most widely used method of determining the travel time of a signal between two spaced points located on the surface of the earth consists of exploding a dynamite charge at the first of said points and recording the resulting vibrations of the ground at the second point. In this method, all the energy of the signal is transmitted at the same time and the elimination of undesired components of the composite received signal is by means of frequency discrimination. In general, this method will be recognized as being of the type operating in the frequency domain.

A completely different method of determining the same travel times has been described in Crawford and Doty application, Serial No. 339,374 filed February 27, 1953, now Patent No. 2,688,124, and Crawford and Doty application, Serial No. 426,182 filed April 28, 1954. In this method, the energy is generated sequentially at different frequencies, the only requirement being that the over-all transmitted signal be non-repetitive during a time interval which is at least as long as the longest travel time to be determined. Such a method, wherein the energy is transmitted for a period of time and the discrimination between components of the composite received signal is obtained by correlation of time series respectively representative of the transmitted and received signals, will be recognized as being of the type operating in the time domain.

As explained at length in the aforesaid applications, this method operating in the time domain has great ability to discriminate between signal and noise and between signals having been propagated along various paths of unequal travel times. However, if the propagating conditions are such that more than one of the several energy components of the transmitted signal may reach the receiving location via different paths of equal travel times, by reason of their having traveled at different velocity, the correlation method may be unable to discriminate between such paths.

Therefore, it is an object of the present invention to provide an improvement in the methods of the aforesaid applications by means of which such discrimination is possible.

When a continuous or semi-continuous elastic signal is transmitted from a point, the amount of energy which is propagated over large distances depends for a great part on the local conditions around the sending point. It is well known to persons skilled in this art that the top layer of the earth is mostly non-homogeneous, that the variations of its acoustic impedance may be very large in extremely short distances and that the amount of energy which is propagated depends on the matching of acoustic impedances between the transmitter and the propagating medium.

A further object of this invention is to provide a method and apparatus of the correlation type by means of which the energy transfer from the transmitter to the propagating medium is substantially increased and whereby the attenuating effect of surface inhomogeneities is substantially reduced.

It is a further object of this invention to provide a method and apparatus of the correlation type which is operative under such conditions and in such manner that it can furnish data upon which the ultimate interpretation is based which have heretofore been unattainable.

Another object of the invention is to provide a new method and apparatus of the correlation type in which the transmitted signal is generated successively from a continuous configuration of points at the sending area, whereby a better sampling of the local conditions of said area is secured.

A further object of the invention is to provide a new method and apparatus of the correlation type which furnishes means to discriminate against the signals which reach the receiving location via certain paths and which may be undesirable and objectionable because they may mask signals arriving via other paths essential to the desired interpretation.

Other and more particular objects of the invention will appear as the description proceeds. As previously indicated, throughout the following description this invention will be explained by having particular reference to its application to seismic exploration, but it is evident that it may be used in other fields with signals of different natures and that its scope is not intended to be restricted.

The following description and the annexed drawings are therefore merely illustrative of the invention.

Figure 3:
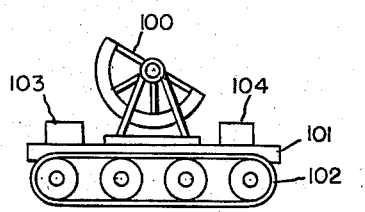
Figure 2:
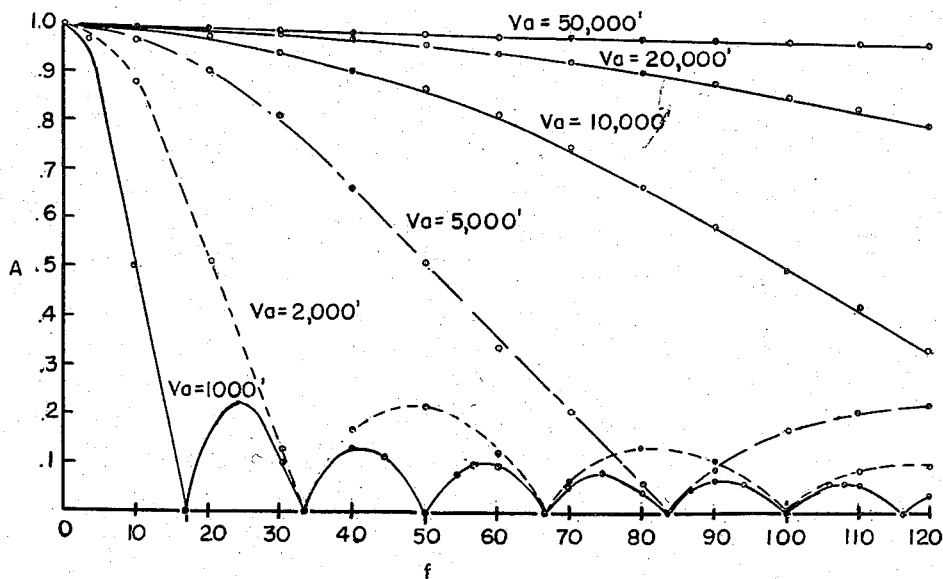

In said annexed drawings:

Fig. 1 is a schematic representation of a cross section of the earth indicating some of the different paths along which elastic energy may be propagated and one manner in which our invention may be carried out;

Fig. 2 is a diagram showing the theoretical relative attenuation of signals of different frequencies when said signals are transmitted from a continuous line 60 feet long and received by a single detector. The different curves correspond to different phase velocities of the wave front along a horizontal surface; and Fig. 3 represents schematically a preferred form of apparatus which may be used to transmit the elastic signal when practicing our invention.

Broadly stated, the present invention provides an improvement in the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time, whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, which improvement comprises, during at least a substantial portion of said time interval within which said signal is transmitted, changing the distance between the locations wherein said signal is generated and detected.

The method, as described in the aforesaid applications, of determining the travel time of a signal by multiplying a counterpart of the transmitted signal by the received signal and integrating these products at different time phase relationships of said signals with respect to their time-phase relation as originally recorded is commonly referred to as the cross-correlation method or more briefly the correlation method. The values obtained at the end of the integration period are plotted as correlation curves and indicate, as a function of the amount of said time-phase shift, the amount of correlation existing between the transmitted signal and the components of said received composite signal. The maxima of time-phase shifts which produce the correlation curve, indicating time-phase coincidence of said signals, are then parameters of the travel times of said signal along the plurality of paths between said first and second area.

The preceding discussion is an outline of the correlation method, and its principal purpose here is to give a clearer understanding terminology used during the remaining description of the present invention which is an improvement thereon.

In Fig. 1, a cross section of the earth is represented indicating schematically the physical earth features and the signal energy propagation paths determined thereby. Line 1 is the surface of the ground, line 2 is a refracting bed at relatively shallow depth and line 3 is a reflecting bed located at much greater depth. Horizontal and vertical intermediate parts of the cross section have been omitted for convenience.

Following the teachings of said applications, a vibrator 4, consisting of an unbalanced flywheel in this particular representation, is used to generate elastic vibration energy. The elastic signal thus generated is sampled by a detector 5 rigidly coupled to the frame 6 of the vibrating source. Another detector 7 located at a remote point on the surface of the ground generates electrical variations representative of the elastic signal received at said remote point. During the remainder of this description, the electrical variations generated by detector 5 will be referred to as the counterpart signal and the electrical variations generated by detector 7 as the received or composite signal. Both of these electrical variations constitute individual time series which are recorded by a convenient recorder 8 to produce a "memory record" in the manner described in aforesaid application, Serial No. 426,182. The record which is produced by the recorder 8 must be such that it may be stored for a substantial period of time since it is usually made by equipment in the field and then carried to a central laboratory or office for further processing, and this may occur at a much later time. The record thus made must be capable of being reproduced or of generating representative signals which are each respectively indicative of the frequency, amplitude and phase relation of the signals originally recorded, i. e., permitting such signal to be derived from the record. It is to be noted that the said derived signals, while indicative of the frequency, amplitude and phase relation of the signals originally recorded, may be generated at a different rate of speed for facilitating or expediting their subsequent analysis.

It should also be noted that this "memory record" used to regenerate the signals during the playback operation may be edited or "composited" before said playback operation. Such editing is done by cutting and splicing the film on which the signals have been recorded in a manner entirely similar to the one used in editing a movie scene. During such editing, undesired portions of any records may be cut out and the composite loop as finally produced may consist of a series of juxtaposed records or sections thereof taken in the same area but at different times to jointly contribute to the determination of a common integration value. It is possible to control, by means of this editing or compositing, the different factors which determine the shape of the correlation curve and to remedy some undesired results obtained from a systematic field procedure. This great advantage occurs because the correlation method operates in the time domain.

Whereas the schematic representation of Fig. 1 does not indicate any preamplification of the signals before recording, it is well understood that there may be such amplification.

When an elastic signal is generated by vibrator 4, it propagates through the transmission media and reaches detector 7 via many different paths among which the total radiated energy of the signal is divided. Such paths include the direct path along the surface indicated by line 9, the refracted paths along high velocity beds close to the surface such as the path indicated by line 10 (following the upper boundary of high velocity bed 2), and the reflected paths such as the path indicated by line 11.

The received signal detected by detector 7 is a composite signal made up of the various signals reaching detector 7 via said different paths. The correlation method described in said applications provides very powerful means of discriminating between signal and noise and between signals having propagated along various paths having unequal travel times. However, we have discovered that the propagating conditions are frequently such that different energy components of the transmitted signal propagated at different velocities may reach the receiving location simultaneously via different equal travel time paths and such different components upon arrival at a common detection point may carry substantially different amounts of energy. For example, path 9, the direct or surface path, may be the path of principal energy propagation and the energy carried by it may propagate at a relatively slow velocity such as two or three thousand feet per second and reach detector 7 at the same time that a much weaker energy component, due to reflection by a small acoustic impedance contrast at interface 3, and traveling at a much higher velocity, reaches said detector 7. For interpretation of the deeper parts of the earth's structure, path 9 is practically worthless since the desired information must be derived from said weaker reflected signal. The correlation method of said application is not able, usually, to discriminate between such different energy components when they arrive at the detector after substantially equal travel time.

Furthermore, the above-described example is still a relative simplification of the true conditions, because, more than two equal time paths may be present and also some paths may have a dispersive effect. A seismic path is said to be dispersive, when it propagates the different frequency components of a given signal at different velocities. The paths, such as path 9, along which are propagated the high amplitude surface waves are frequently dispersive. The effect of this dispersion on the correlation curve will be readily apparent. It broadens the peaks and reduces their amplitudes since all the different frequencies present in a thus dispersed composite received signal cannot be brought into exact phase coincidence simultaneously with all the corresponding frequencies of the counterpart signal.

One of the advantages of our improvements is that they provide for the neutralization of the effect on the correlation values of such dispersive paths.

We have found also that the results obtained by use of the correlation method may depend on the physical conditions of the earth at and around the transmitting location. This may be explained by the great inhomogeneity of the top-most part of the earth layers. It is well known to those skilled in the art of seismic surveying that the so-called "weathered layer" is non-homogeneous and constitutes a very poor transmission medium and that it is customary, in the conventional shot technique of seismic prospecting, to locate the source of energy below that low velocity layer. However, the cost and impracticability of locating the source at depth have always been serious handicaps to a more extensive use of the seismic method and, by the method of the present invention, we avoid similar limitations upon the correlation method.

The improvement described herein provides for energy transfer from the transmitter to the propagating medium in such a way as to minimize substantially the effect of the attenuation which may be caused by surface inhomogeneities.

Our method comprises generating all of the frequency components of the transmitted signal which enter into the determination of said correlation values, repeatedly along a continuous spatial distribution of points within the transmitting area. The spatial distribution may be of various forms. It may be a straight line extending through the detector locations as indicated in Fig. 1. It may also be a circle described around the center of the transmitting area, or any other geometrical arrangement, radial or made up of sets of respectively perpendicular or parallel lines. Since the method operates in the time domain, the complexity of the scheme does not call for complexity of equipment but only for a slightly longer recording time.

Throughout the following description and in the claims, we shall make use of the terms "apparent velocity" and "apparent wavelength." When a wave front is generated at the surface of the ground as illustrated, for example, in Figure 1, it progresses as a spherical front so that if the earth is flat in the vicinity of the point at which the wave is generated, its front may be visualized as an expanding hemisphere. When the string of detectors extends radially from the point at which the wave is generated, the wave front will progress along the line of the detectors at the actual velocity of the wave front. If, however, the line of detectors is arranged other than on a line extending truly radially from the point at which the wave is generated, then the rate at which the expanding wave front progresses along the line of detectors is greater than the actual velocity thereof, and this velocity at which the wave front progresses along the line of detectors we shall refer to hereinafter as the apparent velocity of the wave. It will be seen that if the angle between the line along which the detectors are located and the radial lines of propagation of the spherically expanding wave front increases or approaches 90 degrees, the apparent velocity increases tremendously. At 90 degrees the apparent velocity would, of course, be a maximum and if the distance between the point of generation of the wave and the line of detectors increases to the extent that the curvature of the expanding wave front approaches zero, the apparent velocity would approach infinity.

The wave fronts which provide the valuable information relative to the subsurface formations being investigated all have an extremely high apparent velocity, as compared with the apparent velocity of the substantially horizontally propagated waves which contribute no worthwhile information. By our improved method, we are able to selectively discriminate between different signals on the basis of their apparent velocity and thus we are able to diminish substantially the effect on the composited record of those horizontally travelling waves which carry no real significant information and which, moreover, have such a high energy level as to materially mask the much lower energy waves which carry the sought for information.

It will thus be seen that just as the real wavelength of a signal is determined by its frequency and the true velocity of the expanding spherical wave front, the apparent wavelength is derived from the apparent velocity and frequency.

While in the broad statement of the invention it is pointed out that a principal feature thereof is a changing of the distance between the transmitting and receiving area during the transmission period and substantially the equivalent results can be secured by moving the physical location of either the vibrator or the detector or both, from a practical standpoint movement of the vibrator is generally preferred, especially when working on dry land. When operating in water covered areas, it is, of course, entirely feasible to fix the vibrator at one location on the bottom and move the detector or detector strings. In order to effect a better sampling of the transmission and receiving areas, it is also feasible to move both transmitter and detectors simultaneously and preferably at different rates. Throughout the following discussion our invention will be described with reference only to the case where the vibrator alone has been moved.

The method of the present invention is particularly applicable, in a manner hereinafter more fully explained, to reducing the effect on the correlation values of those components of the composite signal picked up by the detector which have an apparent velocity of less than a predetermined value. Such predetermined value may be selected. In seismic work, for most locations, this predetermined velocity value will be on the order of about 5,000 feet per second.

In carrying forth the present invention it is necessary that the vibrator be moved for a minimum distance and that its rate of movement be as low as possible but no less than a minimum specified rate. This rate should also be substantially uniform for best results, but this last requirement is not strict.

The transmitted signal is made up of a first plurality of components differing from each other by their frequencies and it reaches the receiving area as a composite signal after propagation along different paths among which its energy is divided and as a result, said composite signal is made up of a double plurality of components which differ from each other by the apparent velocities at which they reach said receiving area, and by their frequencies.

The minimum amount, by which the distance between the points at which said signal is transmitted and received must be changed in order to reduce substantially the effect on the correlation values of that component of said composite signal which reaches said receiving point at an apparent velocity less than a predetermined maximum value, is equal to one half of the apparent wavelength of such component.

In order to prove that the rate of change of the distance between the locations wherein said signal is transmitted and received should be relatively low in order to obtain a substantial reduction of the effects on the correlation values of all the components which reach the receiving area at an apparent velocity less than a maximum value, let us first study the case wherein a single vibrator generates continuously a unique frequency signal of constant energy level while the distance between the vibrator and the detector is simultaneously and constantly varied unidirectionally, i. e., increased or decreased; and wherein the composite received signal comprises an infinite number of components reaching the detector at apparent velocities smaller than the maximum value stipulated above. Let us suppose that the distance between the transmitter and detector has been changed by an amount equal to half a wavelength of the component reaching the detector with an apparent velocity equal to said maximum value, and that this change has been obtained by displacing the transmitter.

The effect of an interfering wave of constant frequency which reaches the detector at a specified apparent velocity may be completely eliminated by using two vibrators or two detectors spaced from each other by a distance equal to one half the apparent wavelength of said interfering wave. The present invention uses a similar principle which may be stated as follows: The effect on the correlation values of a component of the composite received signal is completely cancelled if, and only if, an equal amount of energy has been transmitted from two locations, or from a plurality of locations which may be combined into groups of two locations each, wherein said two locations are separated by a distance equal to one half the apparent wavelength of said component.

Let us find which components are completely eliminated in their effect on the correlation values, and explain how this elimination occurs. Applying the principle stated above, we see that only the components which have been generated at locations which may be combined into a plurality of groups of two locations, wherein said locations are separated by a distance equal to half a wavelength of said components, will be completely eliminated. This requires that the half wavelength of said component be included an even number of times in said amount of change of distance between transmitter and detector. Thus, only the components whose wavelength is an aliquot part of said change in distance will be completely eliminated. If, for instance, the transmitted signal has a 20 cycle highest frequency and the highest apparent velocity wave to be attenuated reaches the detector at an apparent velocity of 5,000 feet per second the distance change being 125 feet, only the interfering waves with an apparent velocity V such that $$\lambda = \frac{v}{20}$$

be an aliquot part of 125 feet will be completely cancelled. Thus $$\frac{v}{20} = \frac{125}{n}$$

wherein n is an integer.

$$V = \frac{2500}{n} = 2500, 1250, 833, 625$$

However, if the waves, having an apparent velocity comprised between these values are not entirely eliminated, they are partially attenuated, and this attenuation is proportional to $n$. Let us explain why. If the signal has been transmitted at two locations separated by half a wavelength, the contribution of these two transmissions is null, thus, if the signal has been transmitted along a distance equal to $$\frac{3\lambda}{4}$$

the contribution to the correlation values of the energy generated during a distance equal to $$\frac{\lambda}{4}$$

at one extremity of the transmission line is eliminated by the contribution to the correlation values of the energy generated during the equal $$\frac{\lambda}{4}$$

distance at the other extremity of the transmission line, thus leaving a net contribution of only the energy generated along the remaining portion of the transmission line equal to $$\frac{\lambda}{4}$$

also, in this case. The attenuation is thus equal to $$\frac{2\lambda}{4} \div \frac{3\lambda}{4} = \frac{2}{3}$$

Now, if the wave has an apparent velocity such that the corresponding wavelength is not an aliquot part of the amount of the change of distance $d$ but that there exists the relation $n \cdot d = m\lambda$ with $m$ larger than $n$, i. e., the wavelength of said wave is smaller than the change of distance $d$ between the transmitter and detector, the contributing part to the correlation values of the energy generated and belonging to that wave will be the energy generated in the remaining portion of the transmission line obtained by subtracting as many of the wavelengths of said waves as it is possible from the total distance change. If the remaining portion is comprised between $$\frac{\lambda}{2}$$

and $\lambda$, according to what has been said in the preceding paragraph, some of the energy transmitted during that portion will also cancel out and, thus, the net contribution to the correlation values of said interfering wave will in all cases be due to the energy generated along a distance smaller than $$\frac{\lambda}{2}$$

For example, let us suppose that the relation is $23\lambda = 5d$, $$d = \frac{23\lambda}{5}$$

We subtract $4\lambda$ and it remains $$d - 4\lambda = \frac{23\lambda}{5} - \frac{20\lambda}{5} = \frac{3\lambda}{5}$$

This is larger than $$\frac{\lambda}{2}$$

since it is $$\frac{6\lambda}{10}$$

Thus, a portion equal to $$\frac{\lambda}{10}$$

will cancel an equal portion of the remaining $$\frac{5\lambda}{10}$$

and the net contribution to the correlation values will be due to only $$\frac{4\lambda}{10} = \frac{2\lambda}{5}$$

The attenuation is $$\frac{23-2}{23} = \frac{21}{23} = 91\%$$

Thus, we have shown that, when a single frequency signal is generated along a certain distance, the maximum contribution of an interfering wave will always be due to at most the energy generated within a distance equal to half a wavelength of said interfering wave.

A reflected wave reaching the detector and travelling in a vertical direction and thus having in infinite apparent velocity suffers no attenuation since all the energy generated along the transmission line reaches the detector after a substantially equal amount of travel time and thus contribute to the correlation values.

The method of the aforesaid applications requires a signal which is non-repetitive during a minimum time interval. In practice, the signal of this type which is used, is a signal of continuously changing frequency. Accordingly, we have to deal with a double multiplicity of components of different frequencies which reach the detector at different apparent velocities.

If a frequency and velocity combination corresponds to an interfering wave component whose wavelength is smaller than twice the change of distance and may be included more than once within said change, and if this component is generated only twice within the distance change, its effect is cancelled only if the distance between the points where this component has been generated is exactly equal to an odd multiple of half wavelengths of said component. But if the distance is not correct, there may be little or even no attenuation. However, if the wavelength of said component is included within the said change of distance and if the component has been generated at every point, its net effect on the correlation value will be at most due to the energy generated for a distance of one half of said wavelength. Since we want to eliminate or materially reduce all the components of frequencies extending continuously within a given range and reaching the detector with an apparent velocity smaller than a given maximum value, the wavelength of all these components extends through a continuous range of values. For example, if we use a sweep of 20 to 80 cycles per second and if we want to reduce the effect on the correlation values of all the waves reaching the detector at an apparent velocity smaller than 5,000 feet per second and if we suppose that, practically speaking, no energy reaches the detector with an apparent velocity smaller than 1,000 feet per second the wavelengths of the components sought to be reduced extend from $$\frac{5000'}{20}=250' \text{ to } \frac{1000}{80}=12'$$

Thus, if we want any reduction at all of the component having a frequency of 20 and a velocity of 5,000 feet per second the change of distance should be at least half the wavelength of said component, i. e., 125 feet. All the other components have a half wavelength shorter than this distance and if they are generated all along this maximum distance their effect on the correlation value will still be only due to the energy generated within half a wavelength. Thus the components with the shortest wavelength will be the most attenuated if all frequencies are generated everywhere along the distance. It must be understood here that each component whose wavelength is an aliquot part of the distance change is completely cancelled while each component, for which an odd number of its half wavelength is included exactly within said distance change, contributes to the correlation value by the energy generated within a full half wavelength. Thus, when we say that the components with the shortest wavelength are the most attenuated, we mean that this is true, in average, for all components having a wavelength around a certain value, in spite of the fact that it is not true for every individual component. However, this progressive average attenuation is only obtained if the frequencies are generated at every point along the change of distance.

The exact determination of the attenuation at different frequencies of interfering waves propagating along the surface at different apparent velocities, and supposing that all frequencies are generated at every point, that is with an infinitely small rate of change of the distance between the vibrator and the detector will be given later on during the description relative to Fig. 2.

Since the rate of change of distance between the vibrator and the detector should be as small as possible, it remains to determine what factors will control its minimum. These factors derive from the existence of a minimum for the amount of change of distance between the vibrator and the detector. Since the cancellation occurs during the integration step, it is obvious that this minimum distance must be covered in a shorter time than the period of integration. Theoretically, this integration time has no superior limit, but practically it is limited by two factors. The first one is economy which prevents the use of extended period of integration beyond any time which would make the method inefficient in comparison with competitive exploration methods. The second one is technical. Equipment noise sets a definite limit to the integration period which may be used profitably for signal-to-noise improvement. Thus, the maximum integration time combined with the minimum distance requirement determines a definite minimum limit for the rate at which the distance between the vibrator and the detector must be changed.

For example, suppose that all interfering waves propagating along the surface between 1,000 and 5,000 feet per second are desired to be attenuated and that the transmitted signal used varies between 20 and 80 cycles per second, while the maximum integration time permissible is two minutes. Then, the optimum rate is defined by the minimum distance required which in this case is $$\frac{5000}{2\times20}=125 \text{ feet}$$

divided by the 120 seconds integration time giving a rate of approximately 1 foot per second.

Furthermore, since the cancellation is improved by a larger number of transmissions of each frequency component within the minimum distance, if the frequency of the transmitted signal is varied linearly or sinusoidally between 20 and 80 cycles per second, the rate of such variation should be made as rapid as mechanically possible in order to provide a large number of transmissions of each frequency component within said minimum distance.

It must be mentioned also that the integration time referred to in the preceding paragraphs is not necessarily the actual time during which the integration is performed during the correlating step. This actual time is reduced by the playback and speed up devices described at length in application No. 426,182. The integration time here means the actual time duration during which the signals have been simultaneously generated and received and which signals correspond to the portions of time series which are multiplied together and the products thereof are added in the integration step.

Referring again to Fig. 1, the center of the transmitting area is indicated at 12 and the paths corresponding to it are indicated by 9', 10', and 11'. One form of the invention consists in dragging the vibrator, while it is operating, along said line and at a slow rate of progression. This may be performed by means of a winch located on a truck solidly anchored to the ground as indicated by 13. If the rate of speed of displacement of the vibrator is slow enough it may be considered that all the frequencies, included in the sweep which has been repeated many times during the operation, have been effectively radiated from every point along the line. For example, if the frequency of the transmitted signal is a linear or sinusoidal function of time and varies up and down between 20 and 80 cycles per second in a three-seconds period, and if the vibrator is displaced along the line at a rate of one foot per second, all frequencies are radiated in a distance of 3 feet which is equal to a quarter of the shortest wavelength of all the components sought to be attenuated; for all practical purposes, all frequencies have been generated all along the transmission line. The mechanical limitations of the vibrator determines the number of sweeps which may be included within the time duration of the change of distance. However, for good attenuation of the short wavelength components, the distance covered by the vibrator during a sweep should not extend much beyond a quarter wavelength of the shortest wavelength component sought to be materially reduced.

Throughout all this transmission period, during which the vibrator is displaced, the transmitted signal and the received signal are recorded by recorder 8. It is well understood, however, that these successive transmissions do not have to be immediately consecutive and that silence periods may be included if deemed useful or necessary. This flexibility results again from the operation of the correlation method in the time domain. Then, the record obtained from recorder 8 and used to derive the final data, that is the correlation curves, may be composited as was described in detail in application Serial No. 426,182 filed April 28, 1954. After compositing, this record is made into a loop which is repeatedly played back and correlated exactly in the manner described in said application.

Comparisons have been made between correlation curves obtained by operating the vibrator at a single location, at a plurality of locations and along a continuous spatial configuration of locations, and it has been found that, in most cases where no useful information could be secured inside a certain travel time by the two first operating procedures, significant data could be obtained from the third one.

It is practically impossible to ascertain how much of the improvement is due to the averaging of the surface condition in the sending area and how much is due to the cancellation of the effect of undesirable paths.

However, an approximate evaluation of the importance of this second effect may be made by referring to Fig 2. In this figure, the frequencies are plotted along the abscissa and the ordinates are indicative of the relative contribution of signals of the various frequencies to the final results, i. e., to the correlation value. The different curves correspond to different apparent velocities of the wave front along a horizontal line. The effective attenuation of those components having a slow apparent velocity is evident.

Applying the principle of reciprocity between the locations and role of the source and the detector, it is known that the result is the same as if a signal were sent from a single location and picked up by a continuous line of detectors averaging the signal received along said line. This signal may be expressed mathematically as:

$$E_{(t)} = \frac{1}{d}\int_0^d \sin \omega\left(t - \frac{x}{V_a}\right) dx$$

$$E_{(t)} = \frac{\sin \frac{\omega d}{2V_a}}{\frac{\omega d}{2V_a}} \sin \omega\left(t - \frac{d}{2V_a}\right)$$

where $E_{(t)}$ is the received signal expressed as a function of time $t$, $\omega$ is the angular velocity and is related to the frequency $f$ of the transmitted signal by $=2\pi f$, $d$ is the length of the line along which the signal is detected, $V_a$ is the horizontal apparent velocity of the signal arriving along said line, and $x$ is the space variable along said line used here as variable of integration.

It is seen that the amplitude of the response as a function of frequency is given by $$A_{(\omega)} = \frac{\sin \frac{\omega d}{2V_a}}{\frac{\omega d}{2V_a}}$$

The different curves indicated in Fig. 2 correspond to different values of $V_a$ indicated along said curves. From them, it can be seen that all incoming waves of low apparent velocity are severely attenuated, while the incoming waves of high apparent velocity are substantially attenuated at the high frequencies only. Since $\omega$ and $d$ play identical holes in the formula, it is obvious that Fig. 2 could be interpreted as well as indicating the attenuation of interfering waves of different velocities at a unique frequency as a function of the distance along which the vibrator is dragged. The only difference would be that the abscissas would represent different values of $d$. The first zero of each curve would correspond to a value of the abscissa equal to half a wavelength of the unique frequency. It is thus possible to compute the minimum length $d$, which will procure a desired degree of attenuation of all the interfering waves which have an apparent velocity smaller than a given $V_a$, and, at the same time, will keep substantially unattenuated the early reflections which have relatively low apparent velocities compared to the later reflections.

If the surface conditions are such that the dragging of the vibrator on the ground becomes practically impossible, other methods of applying the principle of the invention are readily available. Fig. 3 is a representation of a piece of apparatus preferred to practice the invention. It is designed for conditions in which the top soil offers slight resistance to the hammering effect of the vibrator. The vibrator is then mounted on a crawler with a tractor-like caterpillar system for equalizing the load on a larger surface of the ground. The structure must be very stiff and rigid in order to avoid resonant frequencies in the range of the seismic signal to be generated. In Fig. 3 an unbalanced flywheel vibrator indicated as 100 is mounted on a frame 101 rigidly coupled to a caterpillar tread 102. A prime mover for the vibrator is indicated at 103 and a detector for sampling the generated signal is diagrammatically represented by 104. The unit may be towed or self-propelled, but again resonant vibrations must be avoided, because they generate peaks in the spectrum of the transmitted signal which will cause unwanted characteristics in the correlation curves, in particular tend to give them a semi-periodic appearance. This last effect would create ambiguity in the determination of the travel times of the signal.

By having reference to Fig. 1 it will be observed that the physical displacement of the vibrator with respect to the detector causes some slight change in the total distance traversed by the reflected and refracted waves although because of the shape and relative size of the triangles or geometrical configurations involved, it is usually not necessary to correct for such displacement of the vibrator in determining travel time although when investigating shallow beds correction can be made for such displacement as shown in the earlier application Serial No. 426,182.

While in the drawings and in the preceding description reference has been made to the utilization of only one detector, such as 7 shown in Fig. 1, nevertheless, the present method is utilized to great advantage when employing a string of such detectors. Additional advantages are gained when utilizing the present method by a particular arrangement of the plurality of detectors with respect to the area from which the signal is transmitted and also with respect to each other. For example, decided advantages will be gained by arranging the several detectors in a straight line which when extended will intersect the area from which the signal is transmitted. Moreover, it will be to advantage also to have the spacing between the several detectors such that the distance between such detectors on said line are respectively equal to parameters of the wave lengths of portions of the received or composite signal, i. e., those components of the composite signal whose effect on the correlation curve is to be reduced.

Other modes of applying the principle of the invention may be employed, change being made as regards the details described, provided the features stated in any of the following claims or the equivalent of such be employed.

We, therefore, particularly point out and distinctly claim as our invention:

1. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, the improvement which comprises, changing the distance between the points at which said signal is generated and detected while the signal is being generated.

2. A process in accordance with claim 1 characterized further in that the change in said distance is made continuously and at a substantially uniform rate.

3. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, the improvement which comprises, reducing the effect on said correlation value of at least one component of said signals by changing the distance between the locations wherein said signal is transmitted and received while said signal is being transmitted by an amount which is at least as great as one-half the wavelength of the longest wavelength component of said signal which is detected at usable energy level.

4. A process according to claim 3 particularized further in that said change in distance is at such a rate that during any amount of change which is equal to one-half the wavelength of said component the significant frequency of said component is transmitted at least once.

5. A process according to claim 3 particularized further in that said change in distance is at such a rate that during any amount of change which is equal to one-half the wavelength of said component the significant frequency of said component is transmitted at least twice.

6. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then multiplied and the products thereof integrated during a predetermined period, while shifting the time-phase relation thereof with respect to their time-phase relation as originally recorded and in which the amount of said time-phase shift which yields the greatest magnitude of the integration value is a parameter of said travel time, the improvement which comprises, reducing the effect on said integration value of at least one component of said signals by changing the distance between the locations wherein said signal is transmitted and received while said signal is being transmitted, said change in distance being at such a rate that, during a time interval equal to said predetermined period of integration, said change is at least equal to one-half of the longest apparent wavelength of the components of said composite signal.

7. In the process of determining the travel time of a signal between spaced points wherein there is transmitted from a local area a vibratory signal made up of a succession of energy pulses which, after propagation over a plurality of paths, is then detected as a composite signal in a remote local area, which transmitted signal is non-repetitive during a time interval which is substantially longer than the travel time of such signal along any of said paths by which it reaches the detection area at usable energy levels and in which, for a predetermined period which is at least as long as said travel time plus the uninterrupted duration of said transmitted signal or two times the travel time whichever is the shorter, there are simultaneously and individually recorded time series respectively representative of said transmitted signal and said composite signal and such time series are then correlated while shifting the time-phase relation thereof with respect to their time-phase relation as originally recorded and in which the amount of said time-phase shift which yields the greatest magnitude of the correlation value is a parameter of said travel time, the improvement which comprises, changing the location from which said signal is transmitted while said signal is being transmitted.

8. A process according to claim 7 particularized further in that said change of location is continuous.

9. A process according to claim 7 particularized further in that said change of location is at a substantially uniform rate.

10. A process according to claim 7 particularized further in that said signal is detected at at least two points in said remote area spaced by a distance which is a parameter of the wavelength of a portion of said received signal.

11. A process according to claim 7 particularized further in that said signal is detected at a plurality of points in said remote area, said points arranged as a succession in a straight line with the distances between adjacent points on such a line being respectively equal to parameters of the wavelengths of portions of said received signal.

12. A process according to claim 7 particularized further in that each frequency component of said non-repetitive signal is transmitted at least once within each amount of said change in distance equal to a quarter of the shortest wavelength of said component whose effect on said integration value is to be reduced.

References Cited in the file of this patent

UNITED STATES PATENTS

| | | |
|---|---|---|
| 2,018,737 | Owen | Oct. 29, 1935 |
| 2,321,450 | Athy et al. | June 8, 1943 |
| 2,324,378 | Flude | July 13, 1943 |
| 2,473,469 | Dahm | June 14, 1949 |
| 2,688,124 | Doty et al. | Aug. 31, 1954 |